US009916288B2

(12) United States Patent
Chen (10) Patent No.: US 9,916,288 B2
(45) Date of Patent: Mar. 13, 2018

(54) METHOD AND SERVER FOR PUSHING CELLULAR LEXICON (71) Applicant: Baidu Online Network Technology (Beijing) Co., Ltd, Beijing (CN)

(72) Inventor: Long Chen, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 161 days.

(21) Appl. No.: 14/585,128

(22) Filed: Dec. 29, 2014

(65) Prior Publication Data
US 2015/0254215 A1 Sep. 10, 2015

(30) Foreign Application Priority Data

Mar. 4, 2014 (CN) .......................... 2014 1 0075797

(51) Int. Cl.
G06F 17/22 (2006.01)
H04L 12/58 (2006.01)
G06F 17/27 (2006.01)

(52) U.S. Cl.
CPC ........ G06F 17/2205 (2013.01); G06F 17/276 (2013.01); G06F 17/277 (2013.01); G06F 17/2735 (2013.01); H04L 51/18 (2013.01)

(58) Field of Classification Search
CPC .............................. G06F 17/277; G06F 17/276
(Continued)

(56) References Cited

U.S. PATENT DOCUMENTS 6,600,919 B1 * 7/2003 Kawase ............ H04M 1/72522
455/414.1
7,089,493 B2 8/2006 Hatori et al.
(Continued)

FOREIGN PATENT DOCUMENTS

EP 2 518 642 A1 10/2012
JP H11-3331 A 1/1999
(Continued)

OTHER PUBLICATIONS

Amorim, Fabiano, "Number of unused indexes," Retrieved from the Internet: URL:http://sqlmonitormetics.red-gate.com/number-of-unused-indexes: (Jul. 4, 2012) XP055210506 [retrieved on Sep. 1, 2015].

(Continued)

Primary Examiner — Lamont Spooner
Assistant Examiner — Oluwadamilola M Ogunbiyi
(74) Attorney, Agent, or Firm — Orrick, Herrington & Sutcliffe LLP (57) ABSTRACT A method and server for pushing a cellular lexicon. The server is used for receiving input method log information sent by a client; acquiring a client identifier and a client-selected word in the input method log information; searching for an undownloaded cellular lexicon in an undownloaded cellular lexicon list corresponding to the client identifier, acquiring a first matching lexicon comprising the client-selected word in the undownloaded cellular lexicon, and adding a first weight value to a lexicon weight value of the first matching lexicon corresponding to the client identifier; pushing the first matching lexicon to a corresponding client when the lexicon weight value is greater than a pushing threshold value; and deleting the pushed first matching lexicon. The server can push a cellular lexicon actually needed by the client, thereby increasing the input precision (Continued)

regarding a certain category of entries, and improving the input efficiency of the client.

20 Claims, 7 Drawing Sheets

(58) Field of Classification Search
USPC .......................................................... 704/10
See application file for complete search history.

(56) References Cited

U.S. PATENT DOCUMENTS

| | | | | |
|---|---|---|---|---|
| 7,149,550 | B2* | 12/2006 | Kraft | G06F 3/0237 |
| | | | | 455/566 |
| 7,644,427 | B1* | 1/2010 | Horvitz | H04H 60/37 |
| | | | | 725/13 |
| 9,131,369 | B2* | 9/2015 | Ganong, III | H04W 12/02 |
| 2006/0171523 | A1* | 8/2006 | Greenwell | H04W 4/00 |
| | | | | 379/242 |
| 2006/0173683 | A1* | 8/2006 | Roth | G10L 15/183 |
| | | | | 704/251 |
| 2007/0265832 | A1* | 11/2007 | Bauman | G06F 17/273 |
| | | | | 704/10 |
| 2008/0243834 | A1 | 10/2008 | Rieman et al. | |
| 2009/0150383 | A1* | 6/2009 | Qiu | G06F 3/0237 |
| 2012/0016675 | A1* | 1/2012 | Hopkins | G10L 13/047 |
| | | | | 704/260 |
| 2012/0158703 | A1* | 6/2012 | Li | G06F 17/30693 |
| | | | | 707/723 |
| 2013/0046544 | A1* | 2/2013 | Kay | G06F 3/04883 |
| | | | | 704/275 |
| 2013/0158987 | A1* | 6/2013 | Xing | G06F 17/276 |
| | | | | 704/10 |
| 2014/0058722 | A1* | 2/2014 | Sun | G06F 17/277 |
| | | | | 704/9 |
| 2014/0074831 | A1* | 3/2014 | Qian | G06Q 30/0601 |
| | | | | 707/731 |
| 2014/0115519 | A1* | 4/2014 | Ouyang | G06F 3/0482 |
| | | | | 715/773 |
| 2014/0363083 | A1* | 12/2014 | Xia | G06K 9/00436 |
| | | | | 382/189 |

FOREIGN PATENT DOCUMENTS

| | | |
|---|---|---|
| JP | H11-25084 A | 1/1999 |
| WO | WO 2014/031505 A1 | 2/2014 |

OTHER PUBLICATIONS

Extended European Search Report, EP Application No. 14200483.7, dated Sep. 8, 2015.

JP, Notice of Grounds for Rejection, Japanese Application No. 2014-264835, dated Jan. 17, 2017.

* cited by examiner

METHOD AND SERVER FOR PUSHING CELLULAR LEXICON

CROSS-REFERENCE TO RELATED APPLICATIONS

The present application claims priority to Chinese Patent Application No. CN201410075797.1, filed on Mar. 4, 2014, the entire disclosure of which is incorporated herein by reference in its entirety and for all purposes.

TECHNICAL FIELD

The present invention relates to the field of communication technology and computers, and in particular to a method and server for pushing a cellular lexicon.

BACKGROUND

With the development of computer technology, computer devices have entered into the work, study and life of people. As a human-machine dialog interface, an input method system provides an encoding method for inputting various characters into a computer or other mobile terminals. Therefore, the input method has become an important means for a user to interact with a computer. The current input method system is generally to provide candidate words and the ranking thereof for the user in an input process based on the candidate words in a lexicon thereof and candidate word weight values corresponding to the candidate words. The candidate words and ranking thereof are an important index of the hit rate of a first choice word in the input process of the user.

Different users have personalized field requirements regarding candidate entries of the input method, for example, a user in the field of computers frequently needs to use technical terms relevant to computers in daily life, while these words are not needed by every user. Therefore, the input method system generally meets this partial requirement by means of a cellular lexicon. The cellular lexicon refers to a functional name of a subdividable lexicon. A cellular lexicon is a vocabulary set of a subdivided category. The category of the cellular lexicon may be a certain professional field (such as a medical field lexicon), and may also be a certain region (such as a Beijing place name lexicon), and may also be a certain game (such as World of Warcraft vocabulary), etc. By selectively downloading specialized lexicons of different fields, the cellular lexicon provided by the input method can be conveniently used by a user end, thereby improving the input efficiency of the user end.

In the prior art, a user mainly acquires a needed cellular lexicon through active downloading; however, with the quickening of the social rhythm, the time for people to study software is getting shorter, and many people are essentially not aware of their own use requirements regarding a certain category of cellular lexicons; meanwhile, the user can merely subjectively determine whether a corresponding cellular lexicon needs to be downloaded through the name of the cellular lexicon, and in some particular cases, it is difficult for the user to acquire all the information about the lexicon only through the name of the cellular lexicon, and therefore, the subjective judgment of the user is not accurate enough; in addition, if the user downloads all the cellular lexicons into a user dictionary, not only will the burden of the input method software be increased, but some candidate words which are not used frequently may also appear in the daily input process of the user, which increases the selection cost of the user regarding the candidate words.

SUMMARY

On that account, the present invention provides a method and server for pushing a cellular lexicon. In the case where a client does not actively download cellular lexicons, a cellular lexicon actually needed by the client is pushed to the client, thereby increasing the input precision of the client regarding a certain category of entries, and improving the input efficiency of the client.

In a first aspect, the embodiments of the present invention provide a server for pushing a cellular lexicon, comprising:

a log receiving unit for receiving input method log information sent by a client;

a parameter acquisition unit for acquiring a client ID and a client-selected word in the input method log information;

a first lexicon weight value accumulation unit for searching for an undownloaded cellular lexicon in an undownloaded cellular lexicon list corresponding to the client ID, acquiring a first matching lexicon comprising the client-selected word in the undownloaded cellular lexicon, and adding a first weight value to a lexicon weight value of the first matching lexicon corresponding to the client ID;

a lexicon pushing unit for pushing the first matching lexicon with the lexicon weight value corresponding to the client ID being greater than a pushing threshold value to a client corresponding to the client ID; and a list deletion unit for deleting the pushed first matching lexicon in the undownloaded cellular lexicon list corresponding to the client ID.

In a second aspect, the embodiments of the present invention provide a method for pushing a cellular lexicon, which comprises:

receiving input method log information sent by a client, wherein the input method log information comprises a client ID and a client-selected word;

acquiring the client ID and the client-selected word in the input method log information;

searching for an undownloaded cellular lexicon in an undownloaded cellular lexicon list corresponding to the client ID, acquiring a first matching lexicon comprising the client-selected word in the undownloaded cellular lexicon, and adding a first weight value to a lexicon weight value of the first matching lexicon corresponding to the client ID;

pushing the first matching lexicon with the lexicon weight value corresponding to the client ID being greater than a pushing threshold value to a client corresponding to the client ID; and deleting the pushed first matching lexicon in the undownloaded cellular lexicon list corresponding to the client ID.

The technical means of the embodiments of the present invention of, by acquiring a client-selected word in input method log information about a client, searching for a cellular lexicon to which the client-selected word belongs, and when it is judged that the client frequently uses a candidate word in a certain cellular lexicon which is not downloaded by the client, pushing the cellular lexicon to the corresponding client, can implement the technical effect of pushing a cellular lexicon actually needed by the client to the client in the case where the client does not actively download the cellular lexicon, thereby increasing the input precision of the client regarding a certain category of entries, and improving the input efficiency of the client.

DETAILED DESCRIPTION OF THE PREFERRED EMBODIMENTS

In order to make the objectives, technical solutions and advantages of the present invention more clear, the specific embodiments of the present invention are further described in detail with reference to the accompanying drawings hereinbelow. It should be understood that the specific embodiments described here are only used for explaining the present invention, rather than limiting the present invention. Additionally, it also needs to be noted that, for ease of description, the accompanying drawings only show the parts related to the present invention rather, than all the contents.

First Embodiment

Figure 1:
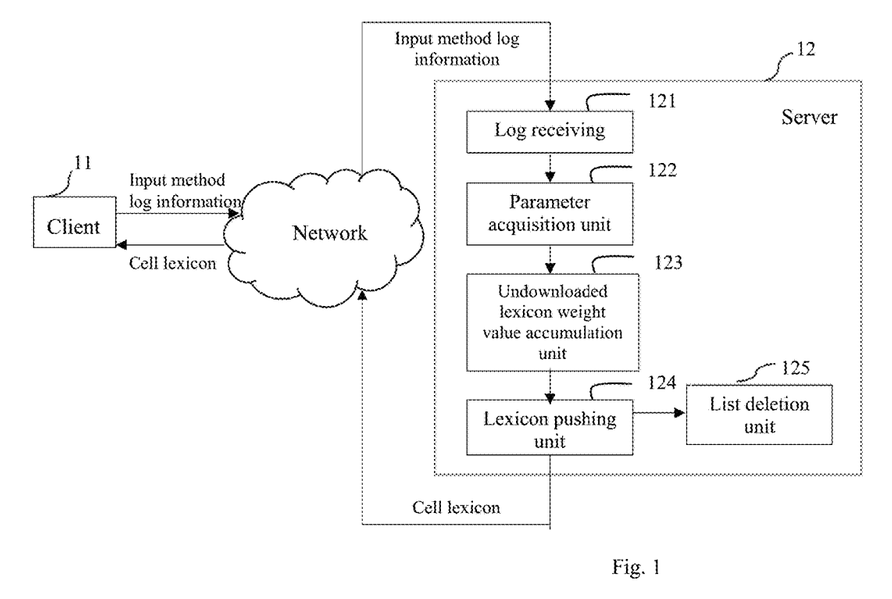
FIG. 1 is a schematic diagram of a system for pushing a cellular lexicon of a first embodiment of the present invention.

FIG. 1 is a schematic diagram of a system for pushing a cellular lexicon of a first embodiment of the present invention. As shown in FIG. 1, a system 10 for pushing a cellular lexicon comprises: a client 11 and a server 12.

The client 11 and the server 12 are connected via a wired or wireless data network. Being connected via a wired or wireless data network indicates that the server 12 may instantly receive a message sent by the client 11 via a network, or the server 12 may indirectly and non-instantly (e.g. transferred through a message storage server) receive a message sent by the client 11 via a network.

The client 11 is used for sending input method log information to the server 12; receiving a cellular lexicon pushed by the server 12; and updating a user lexicon thereof according to the received cellular lexicon.

Specifically, after meeting a predetermined time trigger condition, the client 11 sends input method log information to the server 12, for example: the client 11 is set to send the input method log information to the server 12 every other day; or, after meeting a predetermined event trigger condition, the client 11 sends the input method log information to the server 12, for example: when the input method log information stored therein is greater than 1 M, the client 11 sends the input method log information to the server 12; or, after detecting a network connection, the client 11 sends the input method log information to the server. Preferably, after successfully sending the input method log information to the server 12, the client 11 deletes the input method log information stored therein.

Specifically, the input method log information sent by the client 11 comprises a client ID and a client-selected word. Table 1 shows a data format of the input method log information. As shown in FIG. 1, the client ID is a device identification of the client, and the client-selected word is a candidate word selected by the client in one input.

TABLE 1

| Client ID | Client selected word |
|---|---|
| 07f52scz | 进栈 (Push on) |

Certainly, those skilled in the art shall understand that the client ID in the input method log information may also use other forms of IDs which may uniquely identify the client identity such as a client physical address or a client network address, which are not limited to this.

Specifically, the cellular lexicon received by the client 11 is a subdivided category of candidate word set, wherein each candidate word in the cellular lexicon has a preset candidate weight value (e.g. 50). Table 2 shows a data format of the cellular lexicon.

TABLE 2

| Cell lexicon name | Candidate character | Candidate character weight value |
|---|---|---|
| Computer | 进栈 (Push on) | 50 |
|  | 包过滤 (Packet filtering) | 50 |
|  | 程序变异 (Program mutation) | 50 |
|  | . . . | . . . |

In this embodiment, the client input method system stores a user lexicon, the user lexicon storing corresponding candidate words, each candidate word having a corresponding candidate word weight value. After receiving the cellular lexicon sent by the server 12, the client 11 adds candidate words in the cellular lexicon into the user lexicon, and when inputting a character string through the input method system, the client acquires candidate words corresponding to the input character string in the user lexicon, and ranks and displays the corresponding candidate words according to the weight values of the candidate words.

For example, when the client 11 has not downloaded a computer-category cellular lexicon, after the client 11 inputs the character string "jinzhan", preferably displayed candidate words are common life vocabulary such as "进展 (progress)" and "进 站 (entering a station)", and after the client 11 downloads and installs the computer-category cellular lexicon, the computer vocabulary "进栈 (push on)" may also be preferentially displayed. By adding a cellular lexicon in the user lexicon, when the client needs to frequently use candidate words of a certain special field, the input efficiency of the client may be improved.

Accordingly, the server 12 is used for receiving the input method log information sent by the client; acquiring the client ID and the client-selected word in the input method log information; searching for an undownloaded cellular lexicon in an undownloaded cellular lexicon list corresponding to the client ID, acquiring a first matching lexicon comprising the client-selected word in the undownloaded cellular lexicon, and adding a first weight value to a lexicon weight value of the first matching lexicon corresponding to the client ID; pushing the first matching lexicon with the lexicon weight value corresponding to the client ID being greater than a pushing threshold value to a client corresponding to the client ID; and deleting the pushed first matching lexicon in the undownloaded cellular lexicon list corresponding to the client ID.

Specifically, the server 12 comprises: a log receiving unit 121, a parameter acquisition unit 122, an undownloaded lexicon weight value accumulation unit 123, a lexicon pushing unit 124 and a list deletion unit 125.

The log receiving unit 121 is used for receiving input method log information sent by a client;

the parameter acquisition unit 122 is used for acquiring the client ID and the client selected word in the input method log information;

the undownloaded lexicon weight value accumulation unit 123 is used for searching for an undownloaded cellular lexicon in an undownloaded cellular lexicon list corresponding to the client ID, acquiring a first matching lexicon comprising the client-selected word in the undownloaded cellular lexicon, and adding a first weight value to a lexicon weight value of the first matching lexicon corresponding to the client ID;

the lexicon pushing unit 124 is used for pushing the first matching lexicon with the lexicon weight value corresponding to the client ID being greater than a pushing threshold value to a client corresponding to the client ID; and the list deletion unit 125 is used for deleting the pushed first matching lexicon in the undownloaded cellular lexicon list corresponding to the client ID.

Specifically, the server 12 receives the input method log information sent by the client in real time, and stores the received input method log information in a predetermined storage space, and when meeting a predetermined time trigger condition, the server 12 processes the received input method log information, for example: the server 12 processes the received input method log information every 2 days, or, when meeting a predetermined event trigger condition, the server 12 processes the received input method log information, for example: every time the input method log information stored in the server 12 is larger than 1 G, the server 12 processes the received input method log information. Preferably, the server 12 deletes the processed input method log information or transfers same to other storage spaces for saving.

In this embodiment, all the cellular lexicons may be stored in the server 12, or all the cellular lexicons are stored in other servers capable of communicating with the server 12.

The cellular lexicons comprise various subdivided categories of vocabulary sets, for example: idioms and common sayings, computer, medicine, space flight and aviation, etc., each cellular lexicon comprising a plurality of candidate words, and each candidate word having a predetermined candidate word weight value.

Specifically, the server 12 stores the undownloaded cellular lexicons list corresponding to the client ID and lexicon weight values of the undownloaded cellular lexicon in the above undownloaded cellular lexicon list corresponding to the client ID. The storage forms of the undownloaded cellular lexicons list corresponding to the client ID and lexicon weight values of the undownloaded cellular lexicon in the above undownloaded cellular lexicon list corresponding to the client ID stored in the server 12 are as shown in Table 3.

TABLE 3

| Client ID | Undownloaded cellular lexicon | Lexicon weight value |
|---|---|---|
| 07f52scz | Computer | 149 |
| | Medicine | 84 |
| | Home decoration | 55 |
| | World of Warcraft | 12 |
| | . . . | . . . |
| a1b2c3 | . . . | . . . |

For example, the format of the input method log information received by the log receiving unit 121 is as shown in Table 1. The client ID in the input method log information acquired by the parameter acquisition unit 122 is "07f52scz", and the client-selected word is "进栈 (push on)". The undownloaded lexicon weight value accumulation unit 123 queries an undownloaded cellular lexicon list corresponding to "07f52scz", as shown in Table 2, searches undownloaded cellular lexicons such as "computer", "medicine", "home decoration" and "World of Warcraft" in the undownloaded cell lexicon list, and finds "进栈 (push on)" in the "computer" cellular lexicon and adds a first weight value to the lexicon weight value of "computer" corresponding to "07f52scz".

As an example rather than a limitation, the first weight value above may be set as 1, and certainly, in actual applications, those skilled in the art may set the magnitude of the first weight value in advance according to actual situations.

Accordingly, after being processed by the undownloaded lexicon weight value accumulation unit 123, the lexicon weight value of the undownloaded cellular lexicon with the name "computer" corresponding to "07f52scz" is changed to 149+1=150.

The lexicon pushing unit 124 judges whether the lexicon weight value after adding the first weight value of the undownloaded cellular lexicon with the lexicon name "computer" corresponding to "07f52scz" is greater than a pushing threshold value: if so, pushing the cellular lexicon with the lexicon name "computer" above to the client corresponding to "07f52scz".

As an example rather than a limitation, the pushing threshold value above may be set as 149, and certainly, in actual applications, those skilled in the art may set the magnitude of the pushing threshold value in advance according to actual situations.

After the lexicon pushing unit 124 pushes the "computer" lexicon to the client corresponding to "07f52scz", the list deletion unit 125 deletes the "computer" lexicon in the undownloaded cellular lexicon list corresponding to "07f52scz".

In this embodiment, when undownloaded cellular lexicon information corresponding to the received client ID is not stored in the server 12, the server establishes an undownloaded cellular lexicon corresponding to the received client ID and sets all the cellular lexicons as undownloaded cellular lexicons corresponding to the client ID and sets all the lexicon weight values of the undownloaded cellular lexicons as an initial value, and preferably, the initial value is set as 0.

In a preferred implementation of this embodiment, all the cellular lexicons are stored in at least one lexicon server capable of communicating with the server 12, and the server 12 queries a cellular lexicon corresponding to the client-selected word by means of accessing the lexicon server.

Figure 2:
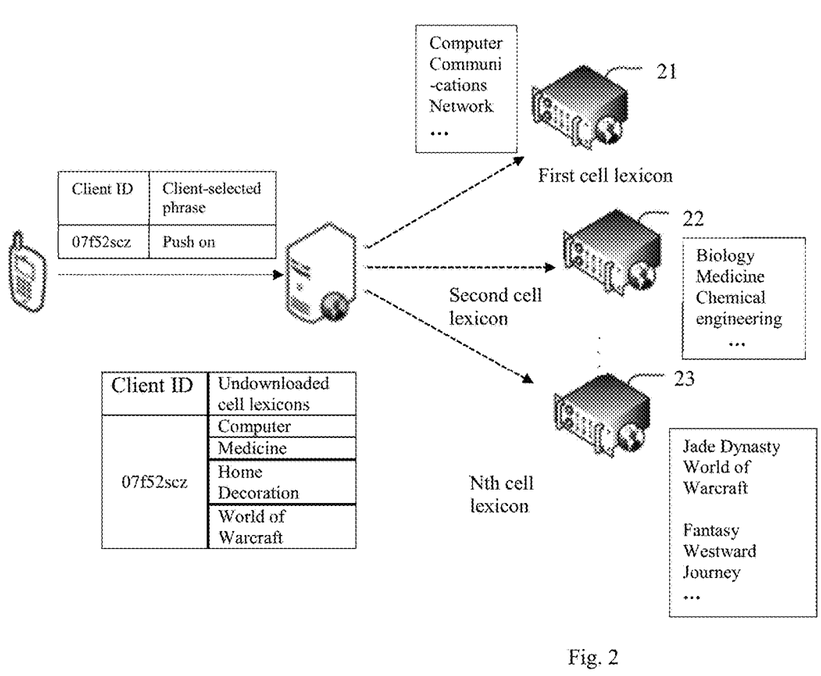
FIG. 2 is an application scenario of a preferred implementation of a first embodiment of the present invention.

FIG. 2 shows an application scenario of a preferred implementation of this embodiment. As shown in FIG. 2, the cellular lexicons are respectively stored in a first cellular lexicon 21, a second cellular lexicon 22, . . . , a Nth cellular lexicon 23, wherein the cellular lexicons stored in the first cellular lexicon 21 comprise computers, communications and networks; the cellular lexicons stored in the second cellular lexicon comprise biology, medicine and chemical engineering; and the cellular lexicons stored in the Nth cellular lexicon comprise Jade Dynasty, World of Warcraft and Fantasy Westward Journey. The server 12 receives the input method log information sent by the client 11, acquires an undownloaded cellular lexicon corresponding to client ID according to the client ID in the input method log information, accesses a corresponding lexicon server, and queries a cellular lexicon comprising the client-selected word.

By independently storing cellular lexicons separate from the server 12, this implementation reduces memory requirements for the server 12 and increases the flexibility of the system.

In this embodiment, pushing the cellular lexicon to the corresponding server may adopt the following means: pushing the cellular lexicon to the client, or pushing a server address where the cellular lexicon is located to the client.

Preferably, the client 11 first checks the network environment thereof, and when judging that an advanced data transmission network such as a 3G (3rd-generation, 3rd generation mobile communication) network or a free data transmission network such as Bluetooth, Wi-Fi (wireless fidelity) and infrared exists, downloads the cellular lexicon pushed by the server 12.

Certainly, those skilled in the art can understand that pushing the cellular lexicon to the client may adopt other means, which are not limited to this.

Figure 3:
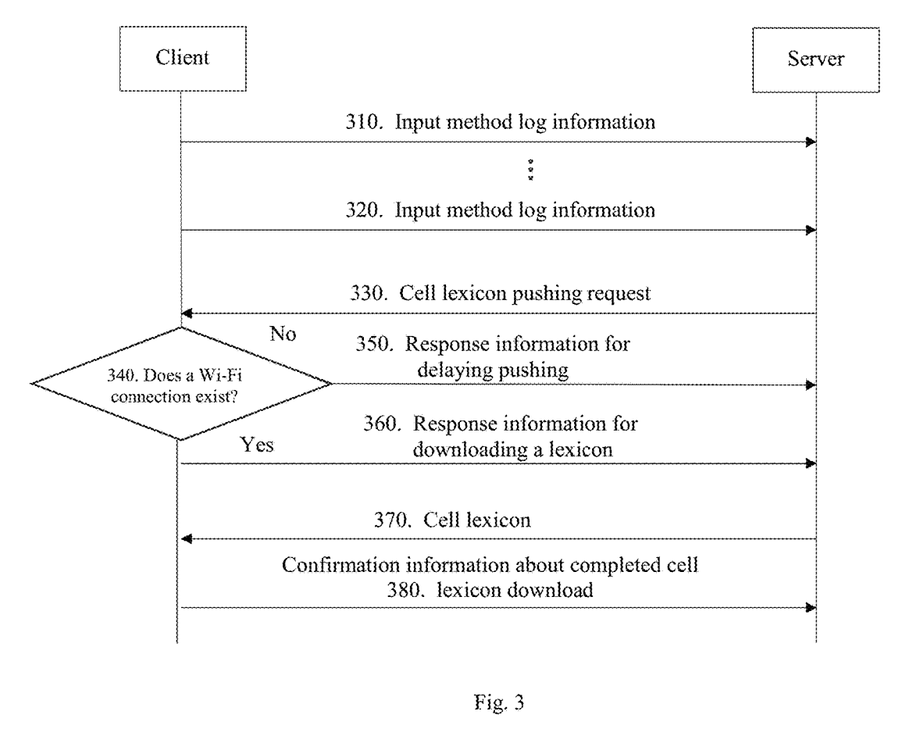
FIG. 3 is a data exchange process whereby a server pushes a cellular lexicon to a client of a first embodiment of the present invention.

FIG. 3 shows a data exchange process whereby a server pushes a cellular lexicon to a client. As shown in FIG. 3, the exchange process comprises:

steps 310-320, a client 11 sends input method log information to a server 12.

Step 330, the server 12 sends a cellular lexicon pushing request to the client 11.

Step 340, the client 11 determines the network environment thereof, and determines whether a Wi-Fi connection exists: if so, step 350 is carried out; otherwise, step 360 is carried out.

Step 350, the client 11 sends response information for delaying pushing to the server 12.

The server 12 sends the cellular lexicon pushing request again according to the received response information for delaying pushing at predetermined time intervals.

Step 360, the client 11 sends a corresponding request for downloading a lexicon to the server 12.

Step 370, the server 12 pushes a cellular lexicon to the client 11.

Step 380, the client 11 sends confirmation information about completed cellular lexicon downloads to the server 12.

The server 11 deletes the cellular lexicon in an undownloaded cellular lexicon list corresponding to the client ID according to the confirmation information about completed cellular lexicon downloads.

In the exchange process, if the server detects that the client is not connected to a network, the server sends a cellular lexicon pushing request to the client at every predetermined period of time. As an example rather than a limitation, the predetermined time above may be set as 1 hour, and certainly, in actual applications, those skilled in the art may set the magnitude of the predetermined time in advance according to actual situations.

This preferred implementation determines the network environment at the client, and downloads the cellular lexicon pushed by the server when the network environment is appropriate, thereby avoiding the influence of the client on data traffic when the cellular lexicon pushed by the server is too large, and the influence of the client currently using the network on the network download speed.

Figure 4:
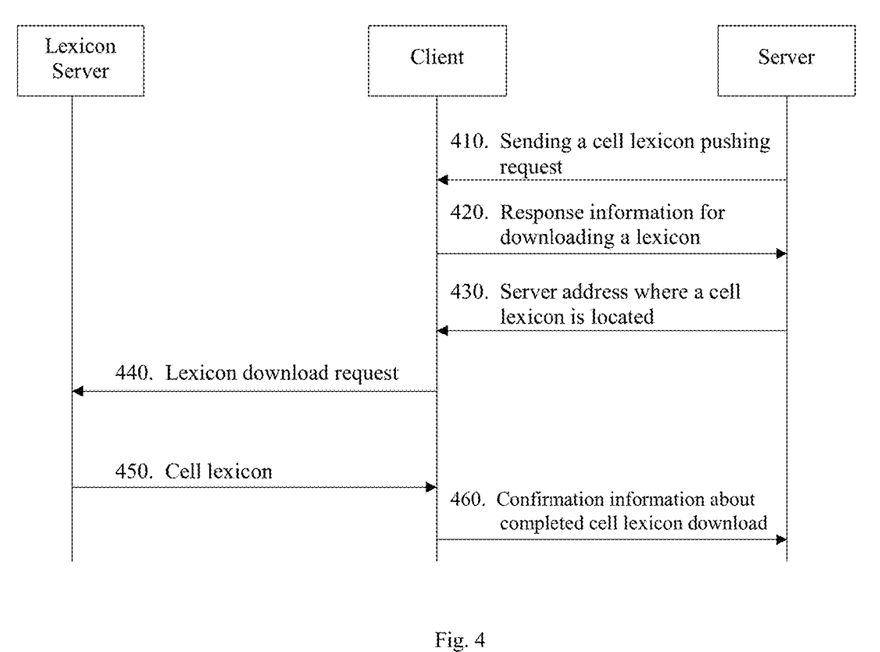
FIG. 4 is another data exchange process whereby a server pushes a cellular lexicon to a client of a first embodiment of the present invention.

FIG. 4 shows another data exchange process whereby a server pushes a cellular lexicon to a client. As shown in FIG. 4, the exchange process comprises:

step 410, the server 12 sends a cellular lexicon pushing request to the client 11.

Step 420, the client 11 sends response information for downloading a lexicon to the server 12.

Step 430, the server 12 sends a server address where a cellular lexicon is located to the client 11.

Step 440, the client 11 sends a lexicon download request to the lexicon server.

In the present data exchange process, the client sends a lexicon download request to the corresponding lexicon server according to the received lexicon server address.

Step 450, the lexicon server pushes a cellular lexicon to the client 11.

In the present data exchange process, the lexicon server pushes the corresponding cellular lexicon to the client according to the lexicon download request sent by the client.

Step 460, the client 11 sends confirmation information about completed cellular lexicon downloads to the server 12.

The server 12 deletes the cellular lexicon in an undownloaded cellular lexicon list corresponding to the client ID according to the confirmation information about completed cellular lexicon downloads.

In another possible exchange process in this embodiment, after receiving response information for downloading a lexicon sent by the client 11, the server 12 sends a cellular lexicon download request to the lexicon server, downloads the cellular lexicon pushed by the lexicon server, and pushes the downloaded cellular lexicon to the client. Preferably, after the client completes lexicon downloading, the server deletes the corresponding cellular lexicon.

In another possible exchange process in this embodiment, after receiving response information for downloading a lexicon sent by the client, the server sends a cellular lexicon download request to the lexicon server, and the lexicon server pushes the corresponding cellular lexicon to the client.

The technical means of the embodiments of the present invention of, by acquiring a client-selected word in input method log information about a client, searching for a cellular lexicon to which the client-selected word belongs, and when it is judged that the client frequently uses a candidate word in a certain cellular lexicon, pushing the cellular lexicon to the corresponding client, can implement the technical effect of imperceptibly pushing a cellular lexicon actually needed by the client to the client in the case where the client does not actively download the cellular lexicon, thereby increasing the input precision of the client regarding a certain category of entries, and improving the input efficiency of the client.

In a preferred implementation of this embodiment, the server 12 is further used for querying downloaded cellular lexicons in a downloaded cellular lexicon list corresponding to the client ID, acquiring a second matching lexicon comprising the client-selected word in the downloaded cellular lexicon, and adding a second weight value to the lexicon weight value of the second matching lexicon corresponding to the client ID; and acquiring a cellular lexicon to be deleted with an increment value of the lexicon weight value of the downloaded cellular lexicon corresponding to the client ID being smaller than a deletion threshold within a predetermined time threshold value, sending an instruction to delete the cellular lexicon to be deleted to a client corresponding to the client ID, and deleting the cellular lexicon to be deleted in the downloaded cellular lexicon list corresponding to the client ID.

The client 11 is further used for deleting the corresponding cellular lexicon according to the received deletion instruction.

Accordingly, the server 12 further comprises:

a downloaded lexicon weight value accumulation unit (not shown) for querying a downloaded cellular lexicon in a downloaded cellular lexicon list corresponding to the client ID, acquiring a second matching lexicon comprising the client-selected word in the downloaded cellular lexicon, and adding a second weight value to a lexicon weight value of the second matching lexicon corresponding to the client ID; and a lexicon deletion unit (not shown) for acquiring a cellular lexicon to be deleted with an increment value of the lexicon weight value of the downloaded cellular lexicon corresponding to the client ID being smaller than a deletion threshold within a predetermined time threshold value, sending an instruction to delete the cellular lexicon to be deleted to a client corresponding to the client ID, and deleting the cellular lexicon to be deleted in the downloaded cellular lexicon list corresponding to the client ID.

By collecting statistics on use conditions of the client of candidate words in downloaded cellular lexicons within a predetermined time threshold value, this preferred implementation deletes a downloaded cellular lexicon which is not frequently used by the client, thereby reducing the influence of a lexicon which is not used frequently on the client when using an input method, while reducing the storage burden of the client and further improving the input efficiency of the client.

In another preferred implementation of this embodiment, the input method log information sent by the client further comprises system time corresponding to the client 11 selected word, and the server 12 is further used for acquiring system time corresponding to the client-selected word in the input method log information;

before the adding of a first weight value to a lexicon weight value of the first matching lexicon corresponding to the client ID, the server is further used for calculating the first weight value according to the system time; and before the adding of a second weight value to a lexicon weight value of the second matching lexicon corresponding to the client ID, the server is further used for calculating the second weight value according to the system time. Specifically, the data format of the input method log information above is as shown in Table 4.

TABLE 4

| Client ID | Client selected word | System time |
|---|---|---|
| 07f52scz | 进栈 (Push on) | 2013 Jul. 11 13:22:15 |

Accordingly, the parameter acquisition unit 122 is further used for acquiring system time corresponding to the client-selected word in the input method log information;

the server 12 further comprises a first weight value calculation unit (not shown) for calculating the first weight value according to the system time; and the server 12 further comprises a second weight value calculation unit (not shown) for calculating the second weight value according to the system time.

For example, the input method log information received by the log receiving unit 121 is as shown in Table 4. The parameter acquisition unit 122 acquires the client ID "07f52scz", the client-selected word "进栈 (push on)" and system time "2013-7-11 13:22:15" corresponding to "进栈 (push on)".

Preferably, the current system time, e.g. "2013-7-14 07:15:32", is acquired, and the first weight value and the second weight value are calculated according to the difference between the current system time and operation time (the unit is days).

In an example, the first weight value is set as [1/(current system time−operation time+1)]*A, where A is a predetermined first threshold value. As an example rather than a limitation, the first threshold value above may be set as 1. Certainly, in actual applications, those skilled in the art may set the magnitude of the first threshold value in advance according to actual situations. The second weight value is set as [1/(current system time−operation time+1)]*B, where B is a predetermined second threshold value. As an example rather than a limitation, the second threshold value above may be set as 1. Certainly, in actual applications, those skilled in the art may set the magnitude of the second threshold value in advance according to actual situations.

At this moment, the first weight value is 1/(3+1)*1=0.25; and the second weight value is 1/(3+1)*1=0.25.

It can be understood that calculating the first weight value or the second weight value by means of system time corresponding to the client-selected word may adopt other means, which are not limited to this.

While taking into account the use frequency of the client for a cellular lexicon, this implementation also comprehensively takes into account the selection time of candidate words by the client, and sets different weight values according to the selection time of the candidate words, thereby achieving the effect that the closer to the current time, the greater the weight value, and the greater the influence on the weight value of a lexicon, which enables the cellular lexicon pushed by the server to better satisfy the current input behavior of the client, and further improve the input efficiency of the client.

Below are an embodiment of a method for pushing a cellular lexicon to a client provided in the embodiments of the present invention. The embodiment of the method and the embodiment of the system for pushing a cellular lexicon to a client belong to the same conception, and detailed contents which are not described in detail in the embodiment of the method may refer to the embodiment above.

Embodiment II

Figure 5:
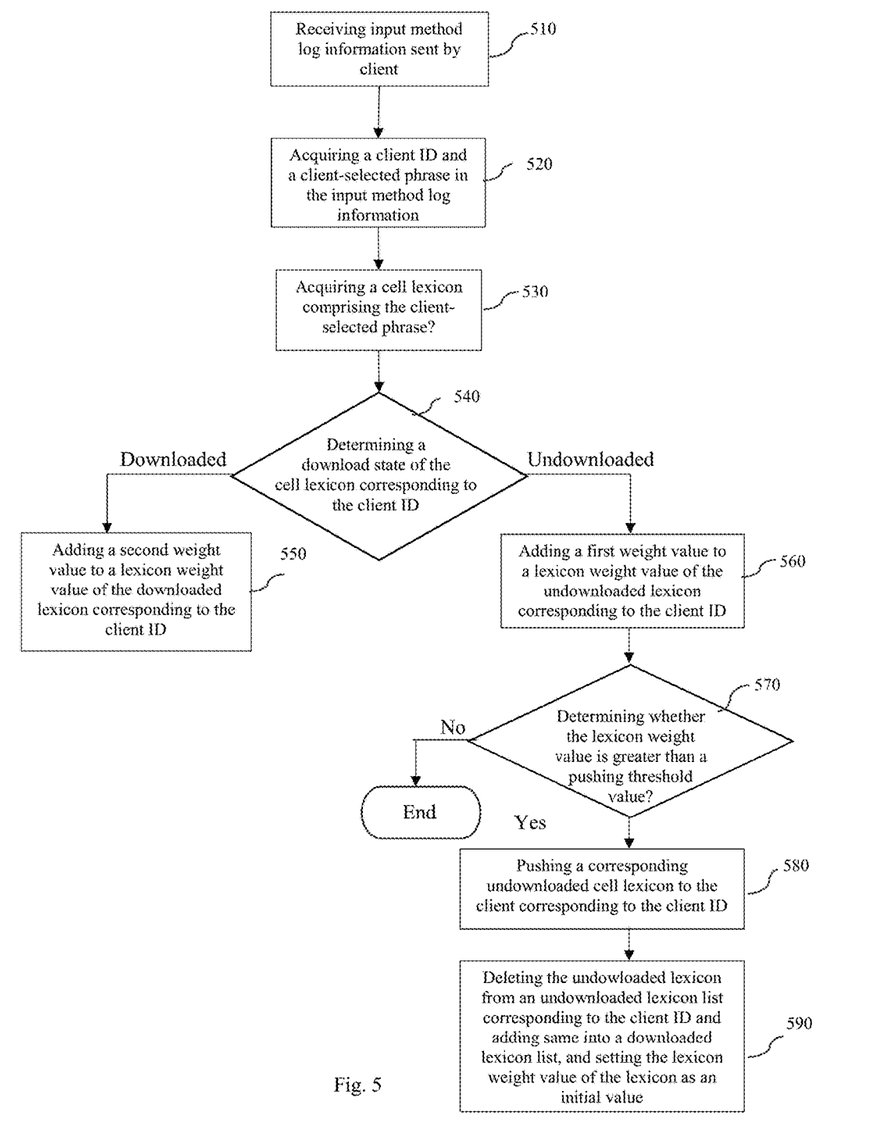
FIG. 5 is a flowchart of a method for pushing a cellular lexicon of a second embodiment of the present invention.

FIG. 5 is a flowchart of a method for pushing a cellular lexicon of a second embodiment of the present invention; as shown in FIG. 5, the method comprises:

step 510, input method log information sent by a client is received.

In this embodiment, the input method log information sent by the client comprises: a client ID and a client-selected word, and the received input method log information sent by the client is as shown in Table 1.

Step 520, the client ID and the client-selected word in the input method log information are acquired.

In this embodiment, the acquired client ID is "07f52scz", and the acquired client-selected word is "进栈 (push on)".

Step 530, a cellular lexicon to which the client-selected word belongs is acquired.

"进栈 (Push on)" is queried in cellular lexicons and the cellular lexicon to which "进栈 (push on)" belongs is acquired. In this embodiment, "进栈 (push on)" belongs to a "computer" cellular lexicon.

Step 540, a download state of the acquired cellular lexicon to which the client-selected word belongs corresponding to the client ID is judged: if it is downloaded, step 550 is carried out; and if it is undownloaded, step 560 is carried out.

In this embodiment, the server saved the download states and corresponding lexicon weight values of cellular lexicons corresponding to the client ID in advance. Table 5 shows a storage form of the download states and corresponding lexicon weight values of the cellular lexicons corresponding to the client ID.

TABLE 5

| | Cell lexicon | | | |
|---|---|---|---|---|
| | Computer | | Medicine | |
| Client ID | Download mark | Lexicon weight value | Download mark | Lexicon weight value | ... |
| 07f52scz | Undownloaded | 149 | Downloaded | 54 |
| 325s2sd | Undownloaded | 58 | Undownloaded | 15 |
| 2f3458y | Downloaded | 256 | Undownloaded | 77 |

In this embodiment, different lexicon download marks are stored corresponding to different client IDs. For example: the download mark of the "computer" lexicon corresponding to "07f52scz" is "undownloaded", which is equivalent to the "computer" lexicon being located in an undownloaded list of "07f52scz"; and the download mark of the "medicine" lexicon corresponding to "07f52scz" is "downloaded", which is equivalent to the "medicine" lexicon being located in a downloaded list of "07f52scz".

Modifying a lexicon mark corresponding to the client ID may delete a certain cellular lexicon from a downloaded list and add same into an undownloaded list, and may delete a certain cellular lexicon from the undownloaded list and add same into the downloaded list.

In this embodiment, as shown in Table 5, the download state of the "computer" cellular lexicon corresponding to "07f52scz" is undownloaded.

Step 560, a first weight value is added to a lexicon weight value of the undownloaded lexicon corresponding to the client ID.

In this embodiment, the first weight value is set as 1, and the lexicon weight value 149 of the "computer" cellular lexicon corresponding to "07f52scz" increases to 150.

Step 570, judging whether the lexicon weight value is greater than a pushing threshold value; if so, step 580 is carried out; otherwise, the present flow ends.

Step 580, a corresponding undownloaded cellular lexicon is pushed to a client corresponding to the client ID.

In this embodiment, the pushing threshold value is set as 149; the lexicon weight value of the "computer" cellular lexicon corresponding to "07f52scz" is determined as being greater than 149; and the "computer" cellular lexicon is pushed to the client corresponding to "07f52scz".

Step 590, the undownloaded lexicon is deleted from an undownloaded lexicon list corresponding to the client ID and added to a downloaded lexicon list, and the lexicon weight value of the lexicon is set as an initial value.

In this embodiment, as shown in Table 5, the download state of the "computer" cellular lexicon corresponding to "07f52scz" is modified to be "downloaded", and the lexicon weight value of the "computer" cellular lexicon corresponding to "07f52scz" is set as an initial value. Preferably, the initial value is set as 0.

In this embodiment, it is assumed that the client-selected word in the acquired input method log information is "抗生素 (antibiotic)", while "抗生素 (antibiotic)" belongs to candidate words in the "medicine" cellular lexicon. The download state of the "medicine" cellular lexicon corresponding to "07f52scz" is "downloaded", and at this moment, step 550 is carried out.

Step 550, a second weight value is added to a lexicon weight value of the downloaded lexicon corresponding to the client ID.

In this embodiment, the second weight value is set as 1, and the lexicon weight value 54 of the "medicine" cellular lexicon corresponding to "07f52scz" increases to 55.

Figure 6:
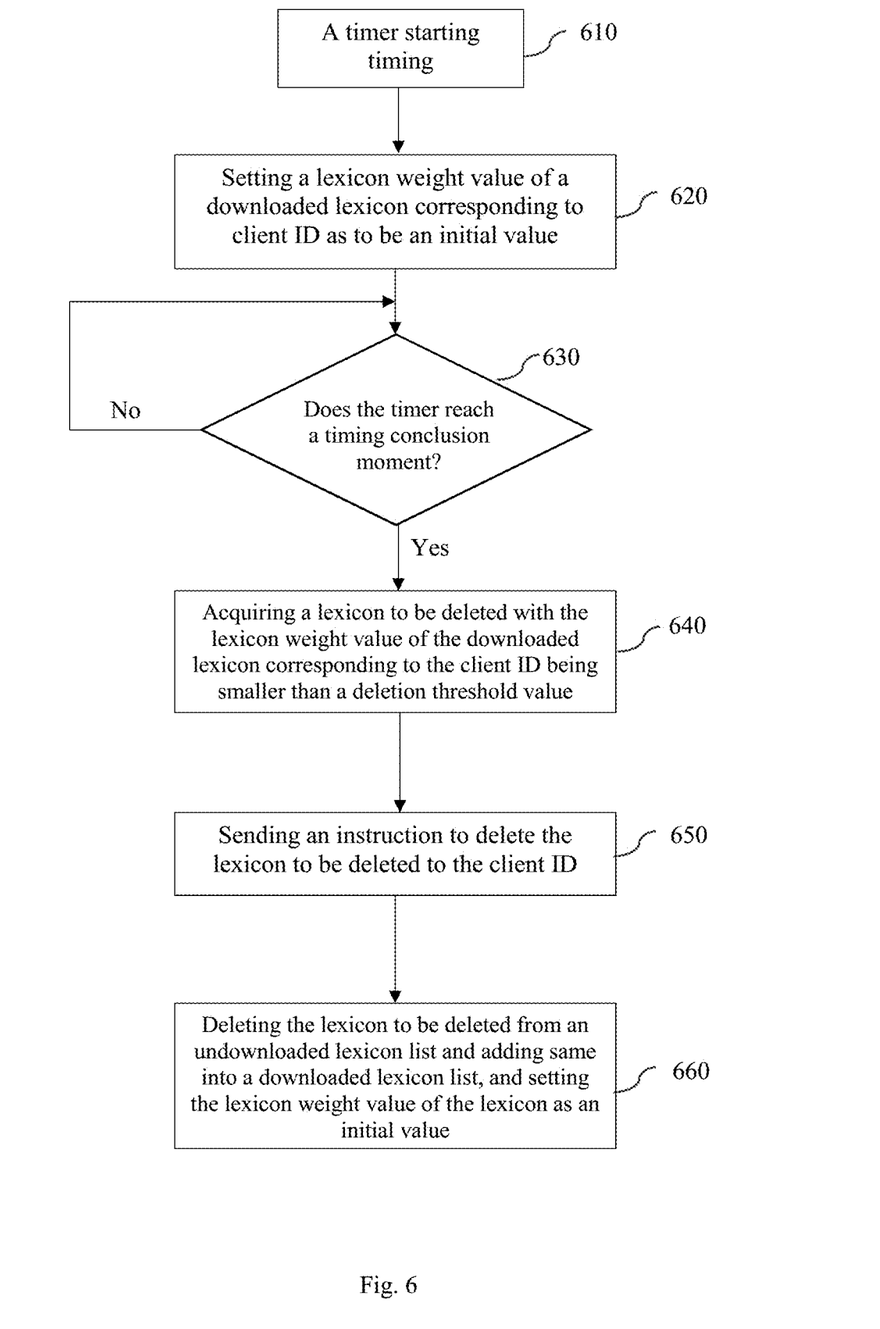
FIG. 6 is a flowchart of a method for deleting a client cellular lexicon of a second embodiment of the present invention.

FIG. 6 shows a flowchart of a method for deleting a client cellular lexicon. As shown in FIG. 6, the method comprises:

step 610, a timer starts timing.

In this embodiment, a server detects whether a downloaded cellular lexicon corresponding to the client ID needs to be deleted within a predetermined time threshold value. As an example rather than a limitation, the predetermined time threshold value above may be set as 1 week, and certainly, in actual applications, those skilled in the art may set the above magnitude of the predetermined time threshold value in advance according to actual situations.

Step 620, a lexicon weight value of a downloaded lexicon corresponding to the client ID is set as an initial value.

As an example rather than a limitation, the lexicon weight value of the downloaded lexicon corresponding to the client ID may be set as 0.

Table 6 shows the processing results of setting the lexicon weight values corresponding to the client ID as initial values in Table 5.

TABLE 6

| | Cell lexicon | | | |
|---|---|---|---|---|
| | Computer | | Medicine | |
| Client ID | Download mark | Lexicon weight value | Download mark | Lexicon weight value | ... |
| 07f52scz | Undownloaded | 149 | Downloaded | 0 |
| 325s2sd | Undownloaded | 58 | Undownloaded | 15 |
| 2f3458y | Downloaded | 0 | Undownloaded | 77 |

Step 630, judging whether the timer reaches a timing conclusion moment: if so, step 640 is carried out; otherwise, step 630 is returned to.

In this embodiment, within the time of one week, the server continuously receives input method log information sent by the client, and adjusts lexicon weight values of the downloaded cellular lexicon and undownloaded cellular lexicon corresponding to the client ID in real time according to candidate words in the input method log information.

Step 640, a lexicon to be deleted with the lexicon weight value of the downloaded lexicon corresponding to the client ID being smaller than a deletion threshold is acquired.

As an example rather than a limitation, the deletion threshold may be set as 100, and those skilled in the art may set the deletion threshold in advance according to actual situations.

Step 650, an instruction to delete the lexicon to be deleted is sent to the client ID.

Step 660, the lexicon to be deleted is deleted from an undownloaded lexicon list and added into a downloaded lexicon list, and the lexicon weight value of the lexicon is set as an initial value.

For example, assuming that one week has passed, the lexicon weight value of the "medicine" cellular lexicon corresponding to "07f52scz" has increased to 55, which is smaller than the deletion threshold; a deletion instruction to delete the "medicine" lexicon is pushed to the client corresponding to "07f52scz", and the download state of "medicine" is modified to be undownloaded; and the lexicon weight value corresponding to "medicine" is set as an initial value. Preferably, the initial value is set as 0.

The technical means of the embodiments of the present invention of, by acquiring a client-selected word in input method log information about a client, searching for a cellular lexicon to which the client-selected word belongs, and when it is determined that the client frequently uses a candidate word in a certain cellular lexicon, pushing the cellular lexicon to the corresponding client, can implement the technical effect of imperceptibly pushing a cellular lexicon actually needed by the client to the client in the case where the client does not actively download the cellular lexicon, thereby increasing the input precision of the client regarding a certain category of entries, and improving the input efficiency of the client. While taking into account the use frequency of the client of a cellular lexicon, the selection time of candidate words for the client is also comprehensively considered, and different weight values are set according to the selection time of the candidate words, thereby achieving the effect that the closer to the current time, the greater the weight value, and the greater the influence on the weight value of a lexicon, which enables the cellular lexicon pushed by the server to better satisfy the current input behavior of the client, and further improve the input efficiency of the client.

Figure 7:
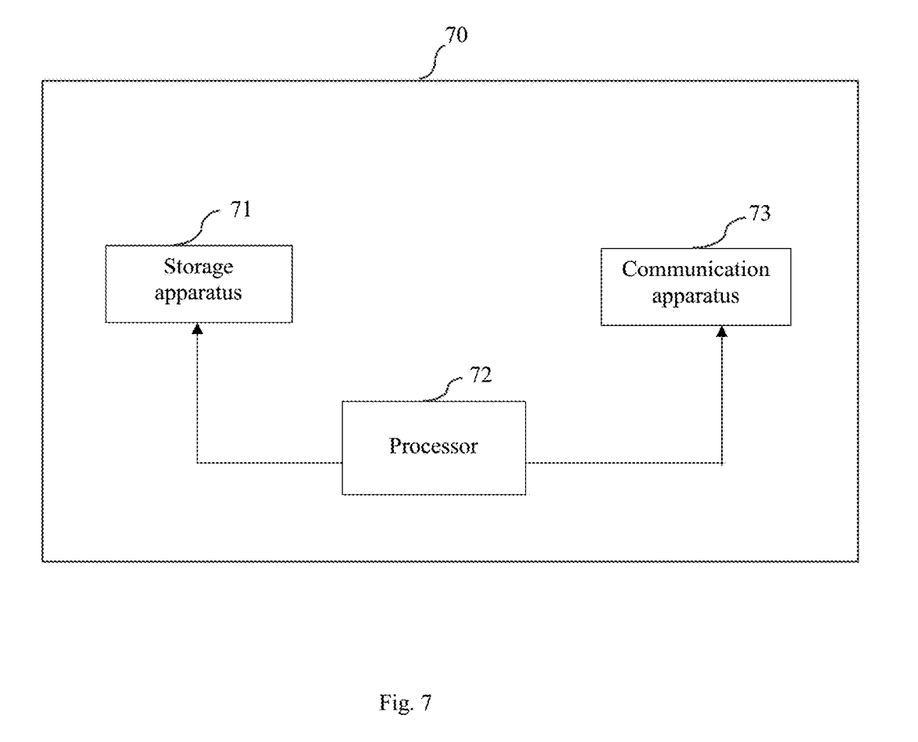
FIG. 7 is a structural schematic diagram of a server which may be used to implement the solution of the present invention.

FIG. 7 is a structural schematic diagram of a server which may be used to implement the solution of the present invention. The server 70 may be used to implement the method provided in the embodiments above. Typically, the server 70 comprises at least one processor 71, at least one storage apparatus 72 and a communication apparatus 73.

The storage apparatus 72 may be used to store programs and data, and the processor 71, by reading and/or operating the data and programs stored in the storage apparatus 72, executes various instructions and performs corresponding data processing. The programs stored in the storage apparatus 72 comprise an operating system, application programs needed by at least one function or step, and so on; and the data stored in the storage apparatus 72 comprises a large amount of input method log information as stated above, and other data information, e.g. cellular lexicons, etc.

The communication apparatus 73 may be used for sending and receiving data in a wireless/wired manner. Preferably, the communication apparatus 73 is a wireless communication apparatus, and may send and receive data based on existing wireless communication techniques (e.g. GPRS (general packet radio service), CDMA (code division multiple access), WCDMA (wideband code division multiple access), LTE (long term evolution), WiFi (wireless fidelity), Bluetooth, etc.).

Obviously, those skilled in the art should understand that various modules or various steps above of the present invention can be implemented by means of the communication terminal as mentioned above. The sending and receiving functions regarding voice messages may be integrated on one and the same communication terminal such that the communication terminal may both send and receive voice messages. Optionally, the embodiments of the present invention may be implemented by means of computer apparatus executable programs, thereby being able to store same in a storage apparatus to be executed by a processor. The programs may be stored in a computer readable storage medium. The storage medium mentioned above may be a read-only memory, a magnetic disk or an optical disc, etc.; or they can be made into various integrated circuit modules, respectively, or they can be implemented by means of making multiple modules or steps thereof into a single integrated circuit module. In this way, the present invention is not limited to any particular hardware and software combination.

The above description is only preferred embodiments of the present invention and is not intended to limit the present invention, and for those skilled in the art, the present invention can have a variety of changes and variations. Any modification, equivalent replacement, or improvement made within the spirit and principle of the present invention shall all fall within the scope of protection of the present invention.

What is claimed is:

1. A method for pushing a cellular lexicon, comprising:
   acquiring input method log information including a client identifier and a client-selected word, the client identifier corresponding to a client device;
   searching within an undownloaded cellular lexicon list corresponding to the client identifier to acquire a first matching lexicon comprising the client-selected word in the undownloaded cellular lexicon list, the undownloaded cellular lexicon list including one or more undownloaded cellular lexicons corresponding to the client identifier;
   calculating a first weight value according to a difference between a current system time and a selection time that corresponds to the client-selected word, the current system time being a system time at a start of said calculating, the selection time being a system time of the client-selected word being selected on the client device according to the input method log information;
   adding the first weight value to a lexicon weight value of the first matching lexicon corresponding to the client identifier; and
   pushing the first matching lexicon to the client device corresponding to the client identifier upon determining that the lexicon weight value of the first matching lexicon corresponding to the client identifier is greater than a pushing threshold.

2. The method of claim 1, further comprising receiving the input method log information.

3. The method of claim 2, wherein said receiving the input method log information comprises receiving the input method log information sent by the client device.

4. The method of claim 1, further comprising deleting the pushed first matching lexicon from the undownloaded cellular lexicon list corresponding to the client identifier.

5. The method of claim 4, further comprising:
   querying a downloaded cellular lexicon in a downloaded cellular lexicon list corresponding to the client identifier;

acquiring a second matching lexicon comprising the client-selected word in the downloaded cellular lexicon list; and adding a second weight value to a lexicon weight value of the second matching lexicon corresponding to the client identifier.

6. The method of claim 5, further comprising:

acquiring a cellular lexicon to be deleted with an increment value of the lexicon weight value corresponding to the client identifier being smaller than a deletion threshold in the downloaded cellular lexicon list within a predetermined time threshold value;

sending an instruction to delete the cellular lexicon to be deleted to the client device corresponding to the client identifier; and deleting the cellular lexicon to be deleted from the downloaded cellular lexicon list corresponding to the client identifier.

7. The method of claim 5, further comprising:

adding the pushed first matching lexicon into the downloaded cellular lexicon list corresponding to the client identifier, and setting the lexicon weight value of the pushed first matching lexicon corresponding to the client identifier as an initial value, wherein said adding the pushed first matching lexicon and said setting the lexicon weight value of the pushed first matching lexicon occur after said deleting of the pushed first matching lexicon.

8. The method of claim 6, further comprising adding the cellular lexicon to be deleted into the undownloaded cellular lexicon list corresponding to the client identifier; and setting the lexicon weight value of the cellular lexicon to be deleted corresponding to the client identifier as an initial value, wherein said adding the cellular lexicon and said setting the lexicon weight value of the cellular lexicon to be deleted each occur after said deleting of the cellular lexicon.

9. The method of claim 5, further comprising calculating the second weight value according to a selection time corresponding to the client-selected word in the input method log information before said adding of the second weight value.

10. The method of claim 9, wherein said calculating the second weight value according to the selection time occurs before said adding the second weight value.

11. The method of claim 1, wherein said calculating comprises setting the first weight value as [1/(the current system time−the selection time+1)]*A, wherein A is a predetermined first threshold value.

12. A server for pushing a cellular lexicon, comprising:

a processor; and a storage apparatus for storing one or more programs to be executed by said processor, the one or more programs including:

instruction for receiving input method log information sent by a client device and including a client identifier and a client-selected word, the client identifier corresponding to the client device;

instruction for acquiring the client identifier and the client-selected word in the input method log information;

instruction for searching in an undownloaded cellular lexicon list corresponding to the client identifier, to acquire a first matching lexicon comprising the client-selected word in the undownloaded cellular lexicon list;

instruction for calculating a first weight value according to a difference between a current system time and a selection time that corresponds to the client-selected word, the current system time being a system time at a start of calculating the first weight value, the selection time being a system time of the client-selected word being selected on the client device according to the input method log information;

instruction for adding the first weight value to a lexicon weight value of the first matching lexicon corresponding to the client identifier, the undownloaded cellular lexicon list including one or more undownloaded cellular lexicons corresponding to the client identifier;

instruction for pushing the first matching lexicon to the client device upon determining that the lexicon weight value corresponding to the client identifier is greater than a pushing threshold value; and instruction for deleting the pushed first matching lexicon from the undownloaded cellular lexicon list corresponding to the client identifier.

13. The server of claim 12, wherein the one or more programs include instruction for querying a downloaded cellular lexicon in a downloaded cellular lexicon list corresponding to the client identifier, acquiring a second matching lexicon comprising the client-selected word in the downloaded cellular lexicon list, and adding a second weight value to a lexicon weight value of the second matching lexicon corresponding to the client identifier.

14. The server of claim 13, wherein the one or more programs include:

instruction for adding the pushed first matching lexicon into the downloaded cellular lexicon list corresponding to the client identifier, and setting the lexicon weight value of the pushed first matching lexicon corresponding to the client identifier as an initial value; and instruction for adding the cellular lexicon to be deleted into the undownloaded cellular lexicon list corresponding to the client identifier, and setting the lexicon weight value of the cellular lexicon to be deleted corresponding to the client identifier as an initial value.

15. The server of claim 13, wherein the input method log information sent by the client device further comprises the selection time corresponding to the client-selected word, wherein the one or more programs include:

instruction for acquiring the system time;

instruction for calculating the first weight value according to the selection time; and instruction for calculating the second weight value according to the selection time.

16. The server of claim 13, wherein the one or more programs include:

instruction for acquiring a cellular lexicon to be deleted with an increment value of the lexicon weight value corresponding to the client identifier being smaller than a deletion threshold in the downloaded cellular lexicon list within a predetermined time threshold value;

instruction for sending an instruction to delete the cellular lexicon to be deleted to the client device corresponding to the client identifier; and instruction for deleting the cellular lexicon to be deleted from the downloaded cellular lexicon list corresponding to the client identifier.

17. The server of claim 12, wherein the one or more programs include instruction for setting the first weight value as [1/(the current system time−the selection time+1)]*A, wherein A is a predetermined first threshold value.

18. A non-transitory computer storage medium including at least one program for pushing a cellular lexicon when implemented by a processor, comprising:

instruction for acquiring input computer storage medium log information including a client identifier and a client-selected word, the client identifier corresponding to a client device;

instruction for searching within an undownloaded cellular lexicon list corresponding to the client identifier to acquire a first matching lexicon comprising the client-selected word in the undownloaded cellular lexicon list, the undownloaded cellular lexicon list including one or more undownloaded cellular lexicons corresponding to the client identifier;

instruction for calculating a first weight value according to a difference between a current system time and a selection time that corresponds to the client-selected word, the current system time being a system time at a start of calculating the first weight value, the selection time being a system time of the client-selected word being selected on the client device according to the input method log information;

instruction for adding the first weight value to a lexicon weight value of the first matching lexicon corresponding to the client identifier; and instruction for pushing the first matching lexicon to the client device corresponding to the client identifier upon determining that the lexicon weight value of the first matching lexicon corresponding to the client identifier is greater than a pushing threshold value.

19. The computer storage medium of claim 18, further comprising instruction for receiving the input computer storage medium log information.

20. The computer storage medium of claim 18, further comprising instruction for deleting the pushed first matching lexicon from the undownloaded cellular lexicon list corresponding to the client identifier.

* * * * *